US008315747B2

(12) United States Patent
Suzuki

(10) Patent No.: US 8,315,747 B2
(45) Date of Patent: Nov. 20, 2012

(54) ELECTRONIC DEVICE COMPRISING FUEL CELL POWER SYSTEM

(75) Inventor: Koji Suzuki, Higashiyamato (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 439 days.

(21) Appl. No.: 12/080,599

(22) Filed: Apr. 4, 2008

(65) Prior Publication Data

US 2008/0247138 A1 Oct. 9, 2008

(30) Foreign Application Priority Data

Apr. 6, 2007 (JP) ................................. 2007-100844

(51) Int. Cl.
*H05K 7/20* (2006.01)
*G06F 1/20* (2006.01)
*G05D 23/00* (2006.01)

(52) U.S. Cl. ...................... 700/300; 700/299; 455/575.3; 713/340; 713/300; 429/36; 429/40; 429/34; 429/24; 429/9

(58) Field of Classification Search .................. 700/300; 361/704; 429/36, 40

See application file for complete search history.

(56) References Cited

U.S. PATENT DOCUMENTS

| 5,602,455 | A  | * | 2/1997  | Stephens et al. ............. 320/106 |
| 6,326,097 | B1 | * | 12/2001 | Hockaday ...................... 429/34 |
| 6,871,399 | B2 | * | 3/2005  | Iwasaki et al. ............. 29/890.03 |
| 6,916,568 | B2 | * | 7/2005  | Guan et al. .................... 429/419 |
| 6,950,729 | B2 | * | 9/2005  | Mitchell et al. ............... 700/286 |
| 6,965,813 | B2 | * | 11/2005 | Granqvist et al. ............ 700/276 |
| 6,998,096 | B2 | * | 2/2006  | Ishikawa ........................... 48/94 |
| 7,132,178 | B2 | * | 11/2006 | Ukai et al. ..................... 429/423 |
| 7,135,246 | B2 | * | 11/2006 | Motoyama et al. ............. 429/26 |
| 7,418,315 | B2 | * | 8/2008  | Nakamura et al. ............ 700/296 |
| 7,450,977 | B2 | * | 11/2008 | Oe et al. ..................... 455/575.3 |
| 2004/0170876 | A1 | * | 9/2004 | Ozeki ............................. 429/22 |
| 2004/0175598 | A1 | * | 9/2004 | Bliven et al. .................... 429/12 |
| 2005/0019629 | A1 | * | 1/2005 | Ikuma et al. .................... 429/23 |
| 2005/0158593 | A1 | * | 7/2005 | Minehisa et al. ............... 429/12 |
| 2006/0083966 | A1 | * | 4/2006 | Ozeki ............................. 429/22 |
| 2006/0204817 | A1 | * | 9/2006 | Yamaguchi ..................... 429/34 |
| 2006/0246329 | A1 | * | 11/2006 | Gopal et al. .................... 429/18 |

(Continued)

FOREIGN PATENT DOCUMENTS

JP 2003-309387 10/2003

(Continued)

OTHER PUBLICATIONS

JP 2003-309387 Machine translation, 2003, pp. 1-6.*

(Continued)

*Primary Examiner* — John R. Cottingham
*Assistant Examiner* — Olvin Lopez Alvarez
(74) *Attorney, Agent, or Firm* — Cozen O'Connor

(57) ABSTRACT

In an electronic device whose source of electric power is a fuel cell and which has a heat radiator that radiates heat by evaporating water generated in accordance with electric power generation of the fuel cell, there are provided a use condition detector that detects use condition of the electronic device, a heat radiation suppression discriminator that discriminates whether to suppress heat radiation by the heat radiator based on use condition detected by the use condition detector, and a heat radiation suppression controller that controls to suppress heat radiation by the heat radiator as a result of the discrimination by the heat radiation suppression discriminator.

6 Claims, 17 Drawing Sheets

U.S. PATENT DOCUMENTS

| | | | |
|---|---|---|---|
| 2007/0027580 A1* | 2/2007 | Ligtenberg et al. | 700/300 |
| 2007/0072023 A1* | 3/2007 | Nakamura et al. | 429/22 |
| 2007/0099046 A1* | 5/2007 | Nakano | 429/22 |
| 2007/0124074 A1 | 5/2007 | Katoh et al. | |
| 2008/0070647 A1* | 3/2008 | Hamamura et al. | 455/575.3 |
| 2008/0120668 A1* | 5/2008 | Yau | 725/110 |
| 2008/0241622 A1* | 10/2008 | Matsuoka et al. | 429/26 |
| 2009/0186257 A1* | 7/2009 | Sakai et al. | 429/34 |
| 2009/0280361 A1* | 11/2009 | Bitoh et al. | 429/17 |
| 2010/0081024 A1* | 4/2010 | Matsuda et al. | 429/24 |
| 2011/0039172 A1* | 2/2011 | Kani et al. | 429/423 |

FOREIGN PATENT DOCUMENTS

| | | |
|---|---|---|
| JP | 2004-302996 | 10/2004 |
| JP | 2004-357193 | 12/2004 |
| JP | 2005-011123 | 1/2005 |
| JP | 2005-332949 | 12/2005 |
| JP | 2007-012873 | 1/2007 |
| JP | 2007-14068 * | 1/2007 |
| JP | 2007-014068 | 1/2007 |
| JP | 2007-150650 | 6/2007 |

OTHER PUBLICATIONS

Dictionary.com, "Define: Shutter", Apr. 2011, pp. 1-2.*

Suzuki, "Machine translation of JP 2007-14068", downloaded on Oct. 2010, pp. 31.*

* cited by examiner

FIG. 3

| HEAT RADIATION CONDITION | CONTENTS OF HEAT RADIATION CONDITION |
|---|---|
| TEMPERATURE | 35 DEGREES C AND OVER |
| PERIOD | EVERY 30 MINUTES |

FIG. 4

| HEAT RADIATION SUPPRESSION CONDITION | CONTENTS OF HEAT RADIATION SUPPRESSION CONDITION | SETTING FLAG |
|---|---|---|
| FUNCTION | CAMERA FUNCTION IN OPERATION IMAGE DISPLAY FUNCTION IN OPERATION | 1 |
| STYLE | OPEN STYLE VIEW STYLE | 0 |
| INSTALLATION STAND | NO INSTALLATION | 0 |
| TIME | 7 A.M. — 8 P.M. | 0 |
| BRIGHTNESS | THE SURROUNDING AREA IS DARK IN THE DAYTIME | 0 |

FIG. 5

| HEAT RADIATION SUPPRESSION RELEASE CONDITION | CONTENTS OF HEAT RADIATION SUPPRESSION RELEASE CONDITION |
|---|---|
| TEMPERATURE | 45 DEGREES C AND OVER |
| WATER QUANTITY | 5 CC AND OVER |

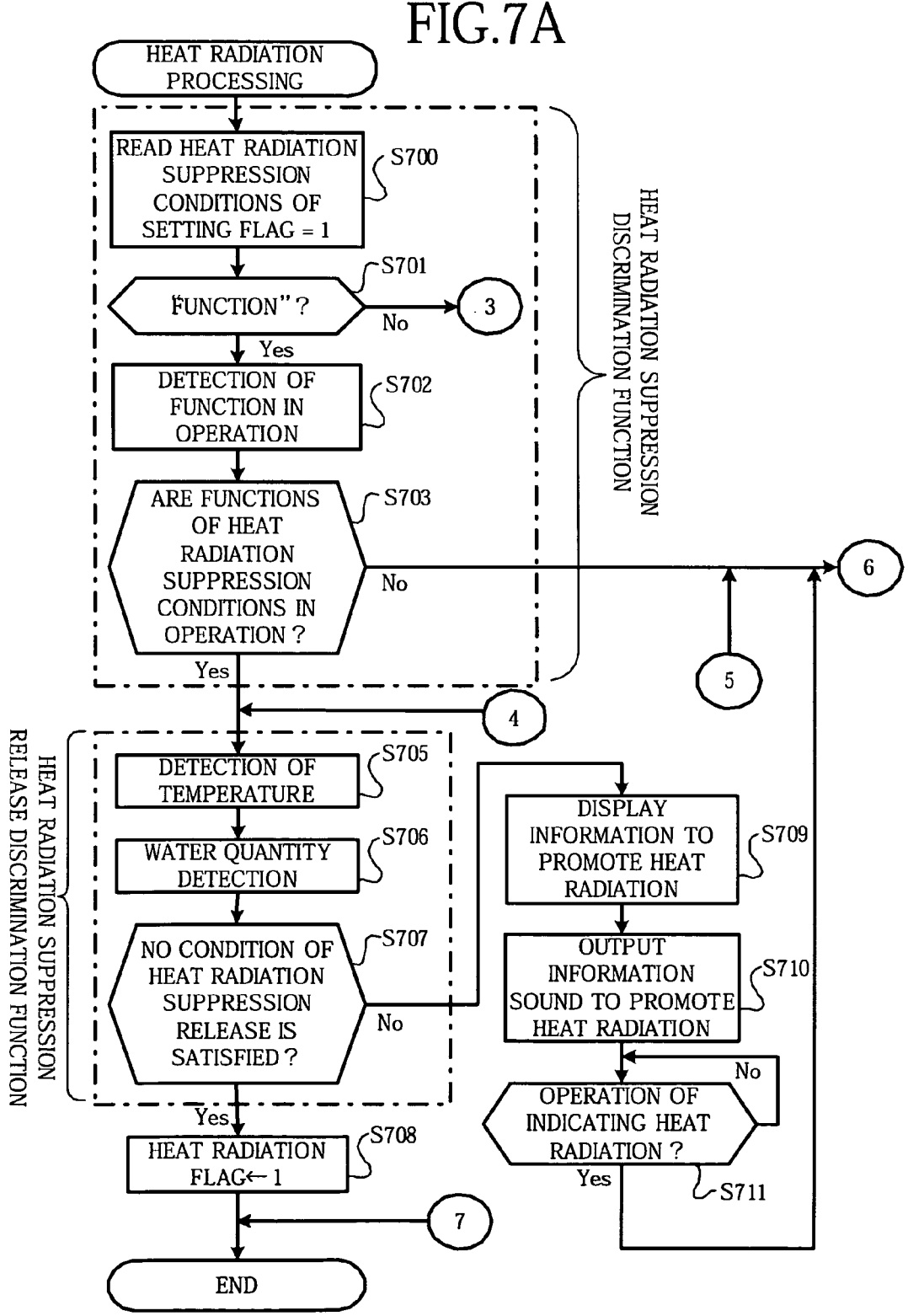

FIG. 9

| HEAT RADIATION SUPPRESSION CONDITION | CONTENTS OF HEAT RADIATION SUPPRESSION CONDITION | SETTING FLAG |
|---|---|---|
| FUNCTION | OPERATION FOR MORE FIVE MINUTES | 1 |
| STYLE | CLOSE STYLE | 0 |
| INSTALLATION STAND | INSTALLATION | 0 |
| TIME | 18:00—20:00 | 0 |
| BRIGHTNESS | GETTING LIGHT | 0 |
| CHARGING | IN CHARGING | 0 |

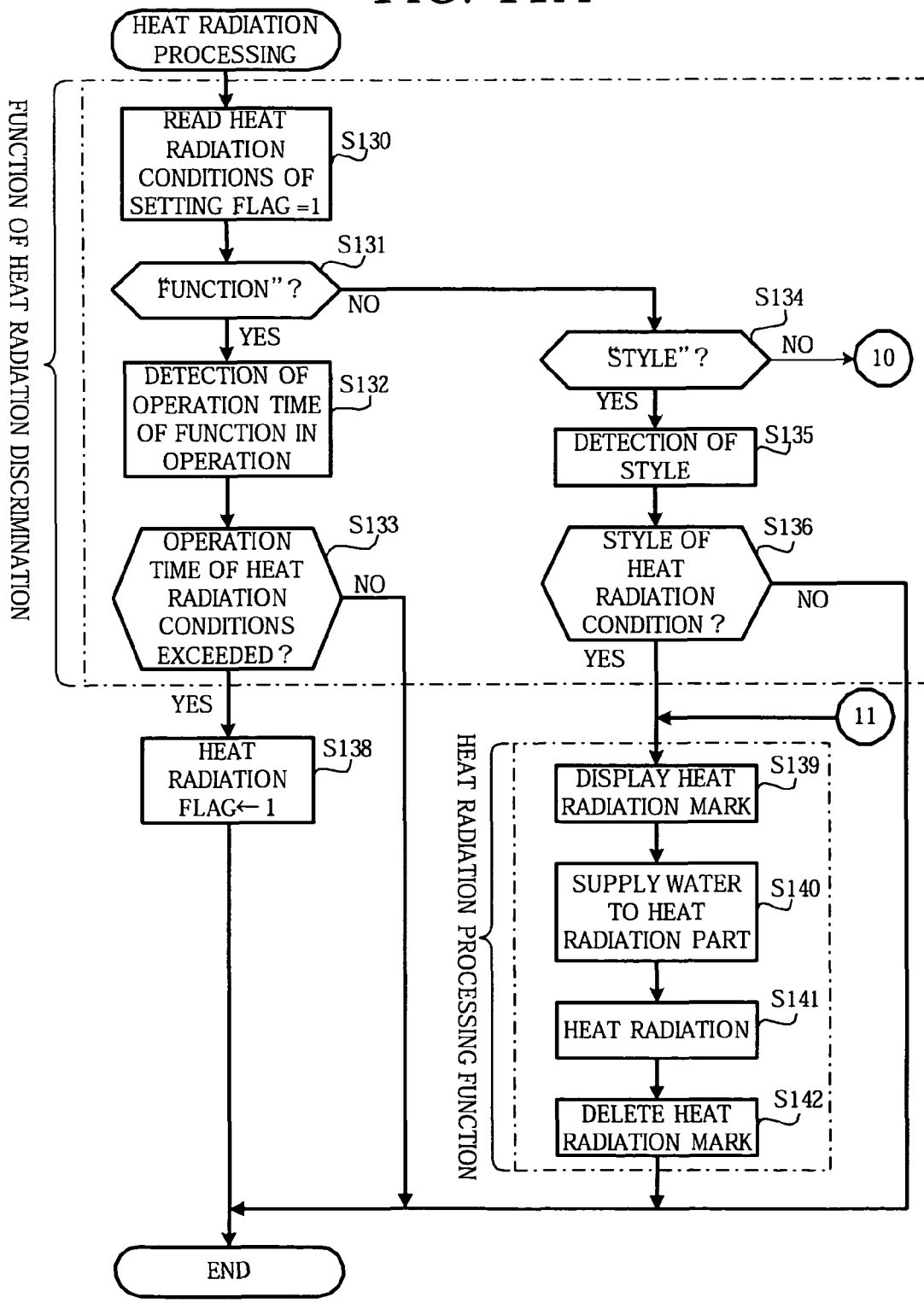

ELECTRONIC DEVICE COMPRISING FUEL CELL POWER SYSTEM

BACKGROUND OF THE INVENTION

1. Field of the Invention

The present invention relates to an electronic device and a recording medium recording a program for the same.

2. Description of the Related Art

In general electronic devices, heat is generated in parts where electric power is consumed. Therefore, in order to normally operate electronic devices, it is necessary to radiate heat.

Fuel cells can obtain electric power generating water through a chemical reaction of oxygen and hydrogen. Nowadays, electronic devices are proposed whose source of electric power is a fuel cell.

As a method of heat radiation of electronic devices having fuel cells, to provide a heat radiation device that radiates heat by vaporization heat supplied by water created upon generation of electric power in the fuel cell is disclosed in Unexamined Japanese Patent Application KOKAI Publication No. 2003-309387.

When using this method of heat radiation, water vapor exhausted outside accompanied by the heat radiation makes users feel difficult to handle electronic devices.

For example, when employing the heat radiation technique for a cellular phone unit having a camera function and image reproduction function, it is assumed that photographing becomes no longer possible because the lens steams up when users are using the camera function.

It is also assumed to happen that a display screen of the cellular phone unit steams up and makes it hard to see when reproducing moving images and still images by the cellular phone unit. Furthermore, when carrying around the cellular phone unit in a pocket of a suit or bag, the inside of the pocket of the suit or bag get wet. And when carrying the cellular phone unit in a crowded train, other people's clothes may get wet.

In the case of conventional type electronic devices whose source of electric power is a general-purpose battery (an alkaline cell, lithium cell, nickel-hydrogen cell, and so on), that is not the fuel cell, there are heat radiation devices of air-cooled type which radiates heat by the wind generated by the rotation of rotating fan and water-cooled type which radiates heat by circulating water.

As for these heat radiation devices, a method of controlling heat radiation at every predetermined period or when exceeding a predetermined temperature is disclosed in Unexamined Japanese Patent Application KOKAI Publication No. 2005-011123.

In the control method, a heat radiation period is fixed because heat is radiated for each predetermined period and when exceeding the predetermined temperature. Therefore, when heat of electronic devices is radiated by vaporization heat of water using the above control method, TPO (Time Place Opportunity) of the user is not satisfied, so that it is inconvenient for the user.

SUMMARY OF THE INVENTION

The purpose of the present invention is to suitably control heat radiation of electronic devices whose source of electric power is a fuel cell in accordance with use conditions.

In order to achieve the above purpose, an electronic device according to a first aspect of the present invention whose source of electric power is a fuel cell and which has a heat radiator that radiates heat by evaporating water generated in accordance with electric power generation of the fuel cell comprises a use condition detector that detects a use condition of the electronic device, a heat radiation suppression discriminator that discriminates whether heat radiation by the heat radiator should be suppressed or not based on the use condition detected by the use condition detector, and a heat radiation suppression controller that controls the heat radiator to suppress heat radiation when the heat radiation suppression discriminator discriminates that heat radiation is to be suppressed.

In order to achieve the above purpose, an electronic device according to a second aspect of the present invention whose source of electric power is a fuel cell and which has a heat radiator that radiates heat by evaporating water generated in accordance with electric power generation of the fuel cell comprises a use condition detector that detects a use condition of the electronic device, a heat radiation discriminator that discriminates whether or not to radiate heat by the heat radiator based on the use condition detected by the use condition detector, and a heat radiation controller that controls heat radiation by the heat radiator in accordance with discrimination results by the heat radiation discriminator.

In order to achieve the above purpose, a computer-readable recording medium storing a program of the electronic device according to a third aspect of the present invention whose source of electric power is a fuel cell and which has a heat radiation function that radiates heat by evaporating water generated in accordance with electric power generation of the fuel cell controls the computer to have a use condition detection function that detects a use condition of the electronic device, a heat radiation suppression discrimination function that discriminates whether or not to suppress heat radiation by the heat radiation function based on the use condition detected by the use condition detection function, and a heat radiation suppression control function that performs control to suppress heat radiation by the heat radiation function as a result of the discrimination by the heat radiation suppression discrimination function.

In order to achieve the above purpose, a computer-readable recording medium storing a program of the electronic device according to a fourth aspect of the present invention whose source of electric power is a fuel cell and which has a heat radiation function that radiates heat by evaporating water generated in accordance with the fuel cell is characterized in that the program controls the computers to have a use condition detection function that detects a use condition of the electronic device, a heat radiation discrimination function that discriminates whether or not to radiate heat by the heat radiation function based on use condition detected by the use condition detection function, and a heat radiation control function that controls heat radiation by the heat radiation function as a result of the discrimination by the heat radiation discrimination function.

BRIEF DESCRIPTION OF THE DRAWINGS

These objects and other objects and advantages of the present invention will become more apparent upon reading of the following detailed description and the accompanying drawings in which:

FIG. 3 is a diagram showing heat radiation conditions and content of their settings stored in a heat radiation condition storing part according to the first embodiment.

FIG. 4 is a diagram showing heat radiation suppression condition and content of its settings stored in a heat radiation suppression condition storing part according to the first embodiment.

FIG. 5 is a diagram showing heat radiation suppression release condition and content of its settings stored in a heat radiation suppression release condition storing part according to the first embodiment.

FIGS. 7A to 7C are flowcharts illustrating the operation of heat radiation processing of the cellular phone unit according to the first embodiment.

FIG. 9 is a diagram showing heat radiation condition and contents of the settings stored in the heat radiation condition storing part according to the second embodiment.

FIGS. 11A and 11B are flowcharts illustrating the operation of heat radiation processing of the cellular phone unit according to the second embodiment.

DETAILED DESCRIPTION OF THE PREFERRED EMBODIMENTS (The First Embodiment of the Present Invention)
(1) Example of System Configuration While referring to FIG. 1, descriptions will be given, as follows, of an example of system configuration using the electronic device whose source of electric power is a fuel cell 28 as a wireless communication system, in which the electronic device is the cellular phone unit 100.

Besides the cellular phone unit 100, other electronic devices will be allowable such as digital cameras, notebook personal computers and PDAs (Personal Digital Assistant), whose sources of electric power are the fuel cell 28.

Figure 1:
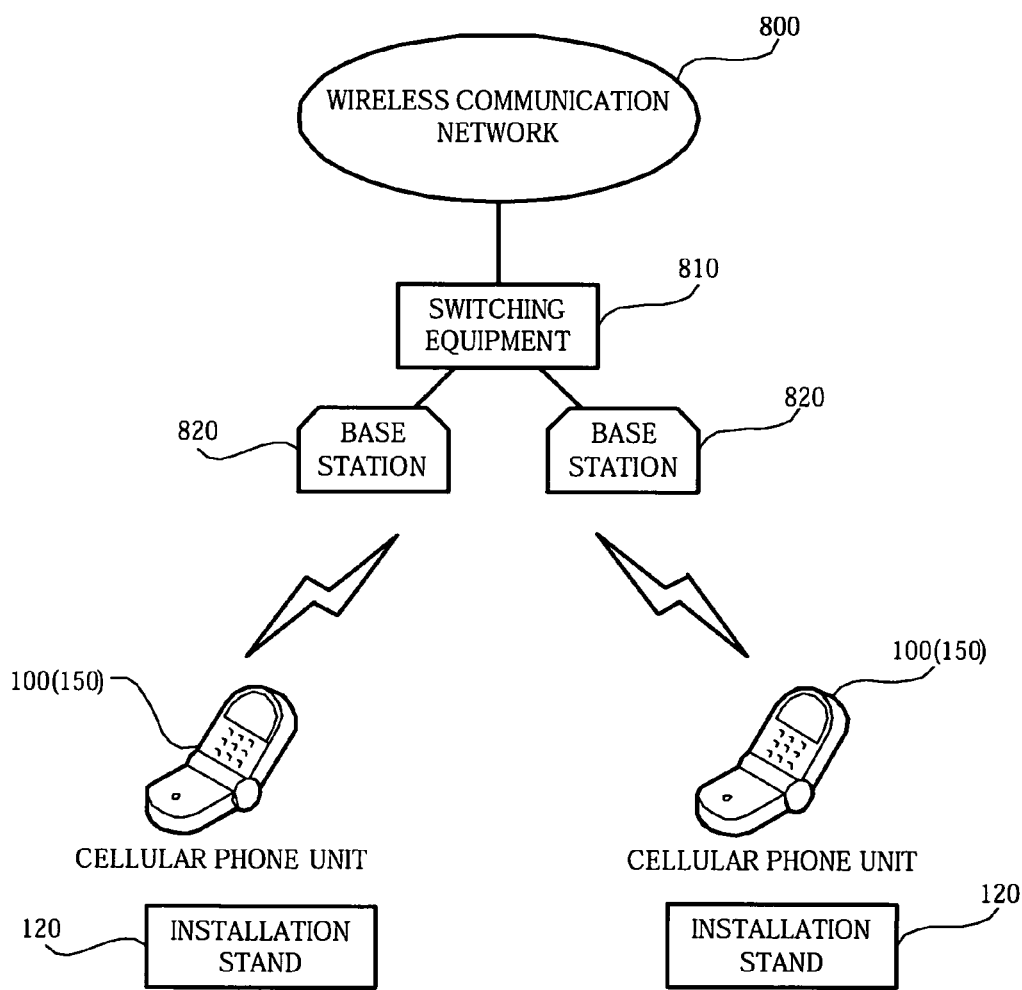
FIG. 1 is a diagram showing an example of configuration of a wireless communication system using a cellular phone unit whose source of electric power is the fuel cell.

FIG. 1 shows a situation, in which switching equipment 810 that switches connections between lines is connected with a wireless communication network 800 operated by cellular phone operators. Multiple base stations 820 are connected with the switching equipment 810 as terminal equipment of the wireless communication network 800.

That is, through the base station 820 and switching equipment 810 connected with the wireless communication network 800, wireless telephone conversation becomes possible between different cellular phone units 100.

The cellular phone unit 100 is held and kept in an installation stand (mounting stand: cradle) 120 in users' home. Such the installation stand 120 also becomes a charging stand that charges a battery 34 as the source of electric power of the cellular phone unit 100.

The cellular phone unit 100 is equipped with a casing having a movable part to take three forms according to use condition.

A first form is a form (posture, outside appearance: hereinafter, referred to as "close style"), in which a display part casing is superimposed on an operating part casing so that a display part 12 cannot be visually confirmed. A second form is a form (posture, outside appearance: hereinafter, referred to as "open style"), in which the display part casing is open to the operating part casing and the display part 12 can be visually confirmed. A third form is a form (posture, outside appearance referred to as "view style"), in which the display part casing is closed to the operating part casing and the display part 12 can be visually confirmed.

In the close style, the display part casing is superimposed on an operating part casing. As a result, the user cannot operate a dial key, which is a substitute for a shutter key installed on an inner side surface of the operating part casing. Then the user presses the shutter key provided on a side surface of the operating part casing to take images. In the close style, since visual confirmation is not possible for the display part 12, the user has to skillfully focus the imaging lens of a camera part provided on an outside surface of the operating part casing on an imaging object to take an image.

When using a camera function of the cellular phone unit 100 in the open style, it is possible to operate not only by the shutter key on the side surface of the above-mentioned operating part casing, but also by a dial key to be a substitute for the shutter key provided on the inside surface of the operating part casing. While confirming the screen displayed on the display part 12, the user can take images by focusing the imaging lens of the camera part on the imaging object.

When using the camera function of the cellular phone unit 100 in the view style, the user cannot operate the dial key, which is a substitute for the shutter key. Therefore, the user has to press down the shutter key to take the image, which is provided on the side surface of the operating part casing and functions as a shutter of the camera. In the view style, the user can visually confirm the display part 12, the user can take the image by focusing the imaging lens of the camera part on the imaging object while confirming the screen displayed on the display part 12.

(2) Example of Device Configuration

Figure 2:
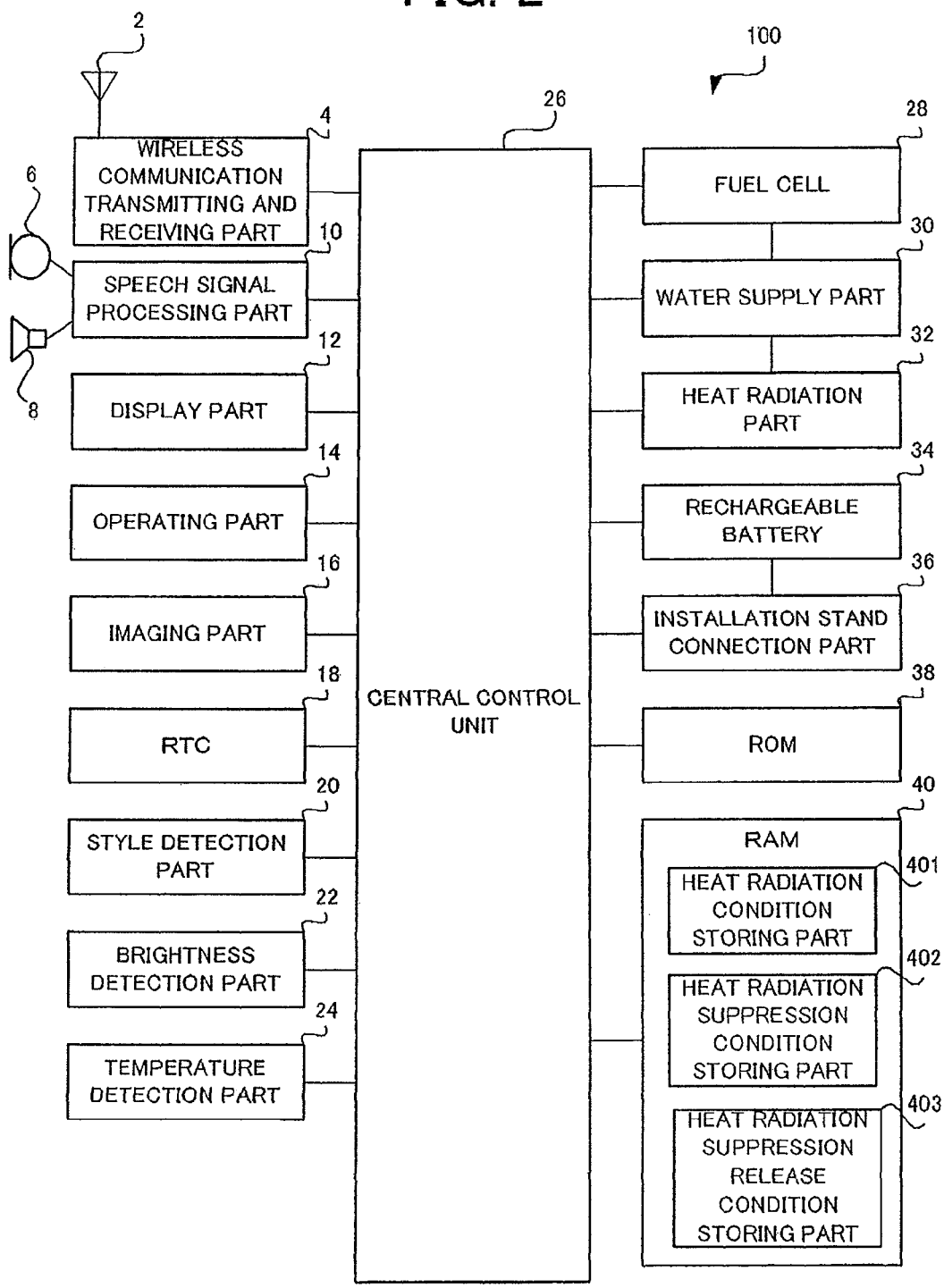
FIG. 2 is a block diagram showing the example of configuration of the cellular phone unit whose source of electric power is the fuel cell according to the first embodiment.

FIG. 2 shows a block diagram of an example of configuration of the cellular phone unit 100 according to the first embodiment, whose source of electric power is the fuel cell 28.

A wireless communication transmitting and receiving part 4 demodulates a wireless signal received via an antenna 2 to a reception base band signal to output it. The output reception base band signal is out put from a speaker 8 via a speech signal processing part 10 as a speech sound. The wireless communication transmitting and receiving part 4 transmits speech data input from a microphone 6 via the antenna 2, which are encoded into a transmission base band signal by the speech signal processing part 10. The wireless communication transmitting and receiving part 4 transmits and receives data via a mobile packet communication network such as e-mails as well.

Upon performing noise removal and amplification for the analog sound signal output from the microphone 6, the speech signal processing part 10 converts it into a digital signal to output it to a central control unit 26. The speech signal processing part 10 converts a digital speech signal output from the central control unit 26 into an analog signal to output to the speaker 8 upon performing noise removal and amplification.

The display part 12 is configured as a display part casing including a display such as a LCD (Liquid Crystal Display). On the display part 12, operation results by the operating part 14, data received via the wireless communication transmitting and receiving part 4, image data taken by the imaging part 16, and so on are displayed.

The operating part 14 is configured as an operating part casing including keys performing dial input, character input, or input of various commands. For example, a shutter key is equipped, which is allocated for a shutter function when the cellular phone unit 100 is used as a camera. The user can take image data at the imaging part 16 by pressing down such a shutter key.

The imaging part 16 is configured including a photographing lens, imaging element, drive circuit, distance measuring sensor, optical sensor, analog processing circuit, signal processing circuit, compression/decompression circuit, and so on. The imaging part 16 performs such as optical zoom adjustment, focus control, shutter drive control, exposure control to output image data taken by the imaging element by pressing down the above-mentioned shutter key to the central control unit 26.

An RTC (Real Time Clock) 18 is a clock to output current time information such as date and time.

A style detection part 20 detects which the current configuration of the cellular phone unit 100 is, close style, open style, or view style. Since the display part casing having the display part 12 and operating part casing having the operating part 14 are coupled via a rotary type two-axis hinge, the style detection part 20 detects which style is the condition of the rotary type two-axis hinge by using a detectable magnetic sensor and micro switch.

Thereby, the central control unit 26 can discriminate the current posture of the cellular phone unit 100 based on the result of style detection in the style detection part 20. Styles detected by the style detection part 20 are specified as the open style, view style, and close style, however, they are not limited thereto. For example, they can only be a style tailored to the structure of the casing such as slide type and rotary revolver type.

A brightness detection part 22 has a light sensor such as a light-receiving diode to detect brightness around the cellular phone unit 100 based on the amount of light received by the light sensor.

A temperature detection part 24 has a temperature sensor such as a thermistor to detect temperature of the cellular phone unit 100 based on the resistance of the temperature sensor.

The fuel cell 28 is a source of electric power of the cellular phone unit 100, obtains electric power by electric power generation through a chemical reaction of oxygen and hydrogen, and is a battery to generate water associated with the chemical reaction.

A water supply part 30 stores water generated in association with the electric power generation of the fuel cell 28 to supply the water with a heat radiation part 32 as needed.

The heat radiation part 32 radiates heat generated when the cellular phone unit 100 is operated. Specifically, the heat radiation part 32 is provided in the vicinity of heat generation area of the cellular phone unit 100 and by evaporating water supplied from the water supply part 30, radiate heat generated at the heat generation area of the cellular phone unit 100 by vaporization heat.

A rechargeable battery 34 is other source of electric power for the cellular phone unit 100 supplementing the fuel cell 28.

An installation stand connection part 36 is an interface part of the cellular phone unit 100 and installation stand 120. Since the installation stand 120 is also used as a charge stand, an external source from the installation stand 120 is supplied to the rechargeable battery 34 via an installation stand connection part 36 and the rechargeable battery 34 is charged by such an external source.

A ROM 38 is a memory that stores programs and various data executed in the cellular phone unit 100. For example, it is obtained by ROMs such as a flash memory.

A RAM 40 has a heat radiation condition storing part 401, heat radiation suppression condition storing part 402, and heat radiation suppression release condition storing part 403.

The heat radiation condition storing part 401 stores "heat radiation condition" for the central control unit 26 to make the heat radiation part 32 radiate heat and the content of their settings. For example, as shown in FIG. 3, "heat radiation condition" and its settings are "temperature condition" and its contents (for example, to radiate heat at 35 degrees Celsius and over) and "periodic condition" and its contents (for example, to radiate heat every 30 minutes).

Thus, settings become possible such that when the ambient temperature of the cellular phone unit 100 is high (when the content of the "temperature condition" is satisfied), heat radiation is conducted, and when it is low (the content of the "temperature condition" is not satisfied), heat radiation is suppressed.

Heat radiation is suppressed at a low temperature because performance of the cellular phone unit 100 is affected when heat radiates under a low temperature environment such as in the ski resort.

Heat radiates for each period specified by the "periodic condition", so that periodic heat radiation is possible as needed.

When "heat radiation condition" shown in FIG. 3 is fulfilled, the heat radiation suppression condition storing part 402 stores "heat radiation suppression condition" showing whether the central control unit 26 controls the heat radiation part 32 to radiate or not, and contents of their settings. For example, FIG. 4 shows "heat radiation suppression condition" and contents of their settings. Specifically, they are "function condition" and its content, "style condition" and its content, "installation stand condition" and its content, "time condition" and its content, and "brightness condition" and its content.

As for the contents of the "function condition", among functions possessed by the cellular phone unit 100, such as "camera function in operation" and "image display function (function to reproduce moving images and still images) in operation" are set.

When these functions are in operation, heat radiation is suppressed even at high temperature. Thereby, adverse affects by heat radiation can be prevented such that photographing by cameras is difficult because lenses steam up with water vapor accompanied by heat radiation, and that an image reproduction screen of the display part 12 becomes hard to see because of water vapor accompanied by heat radiation.

As for the contents of the "style condition", for example, "open style" and "view style" are set.

In the case of the "close style", it is configured in such a way that heat radiates if "heat radiation condition" is fulfilled. In either case of "open style" and "view style", it is configured in such a way that even if "heat radiation condition" is fulfilled, heat radiation is suppressed.

As for the content of "installation stand condition", for example, it is set that the cellular phone unit 100 is "not installed" on the installation stand 120. The installation stand 120 is simultaneously used as a charge stand. When the cellular phone unit 100 is not installed on the installation stand 120, the cellular phone unit 100 is not supposed to be in a charging operation. Therefore, when not installed, since the cellular phone unit 100 is not supposed to generate heat by charging, there is no problem if heat radiation is suppressed.

As for the content of "time condition", for example, it can be set as "from 7 a.m. to 8 p.m.", when the users get aboard a vehicle of public transportation (trains, buses, and so on) for going to work. Thereby, since adverse effects can be assumed such that when the vehicle is crowded, water vapor accompanied by heat radiation may wet clothes of other passengers, the user need to set a desired time to suppress heat radiation.

As for the content of "brightness condition", for example, it is set that "the surrounding area is dark in the daytime". When it is dark around the cellular phone unit 100 despite in the daytime, it is considered that the cellular phone unit 100 is being stored in the pocket or bag of the user. When heat radiates under these conditions, an adverse effect is supposed to occur such that pockets and bags get wet by the water vapor accompanied by heat radiation, therefore, it is configured that heat radiation is suppressed.

"Function condition", "style condition", "installation stand condition", "time condition", and "brightness condition" are stored in the heat radiation condition storing part 401 with a setting flag being corresponded, which specifies that it is valid or invalid. In the example shown in FIG. 4, "function condition" are set as valid (setting flag=1) and other conditions are set as invalid (setting flag=0). As for which condition is set as valid, only one condition or multiple conditions can be set.

The heat radiation suppression release condition storing part 403 stores specified "heat radiation suppression release condition" and its content when heat radiation is still needed even if "heat radiation conditions" are satisfied and "heat radiation suppression condition" is fulfilled.

For example, as shown in FIG. 5, in the "heat radiation suppression release condition", "temperature condition" and its contents (for example, 45 degrees Celsius and over), and "water quantity conditions" stored in the water supply part 30 and their contents (for example, 5 cc and over), are stored.

If "temperature condition" is fulfilled, the performance of the cellular phone unit 100 may be deteriorated unless heat radiates even if "heat radiation suppression condition" is fulfilled. If "water quantity condition" is fulfilled, the cellular phone unit 100 may fail to operate properly due to water leak from the water supply part 30 unless heat radiates even if "heat radiation suppression condition" is fulfilled.

Besides the "water quantity condition", production of electricity of the fuel cell 28 and duration of the power generation of the fuel cell 28 can be adopted. It is because as production of electricity and duration of the fuel cell 28 increase, amount of water generated in accordance with electric power generation of the fuel cell 28 increases as well.

The central control unit 26 integrally controls the cellular phone unit 100 by executing the program stored in a ROM 38. Through executing such programs, various functions of the cellular phone unit 100 can be obtained.

(3) Example of Device Operation

Figure 6A:
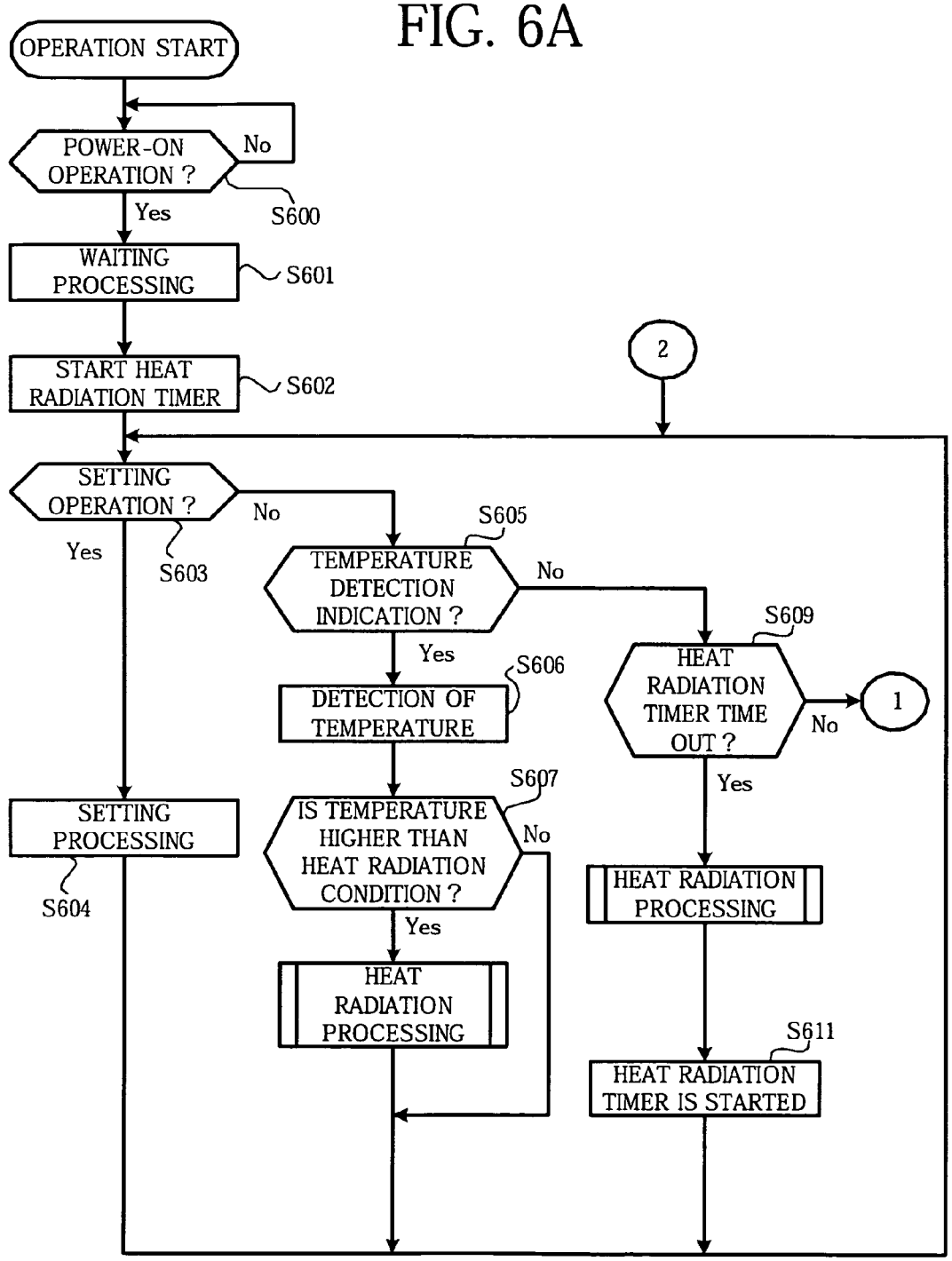
FIGS. 6A and 6B are flowcharts showing primary operations of the cellular phone unit according to the first embodiment.
Figure 6B:
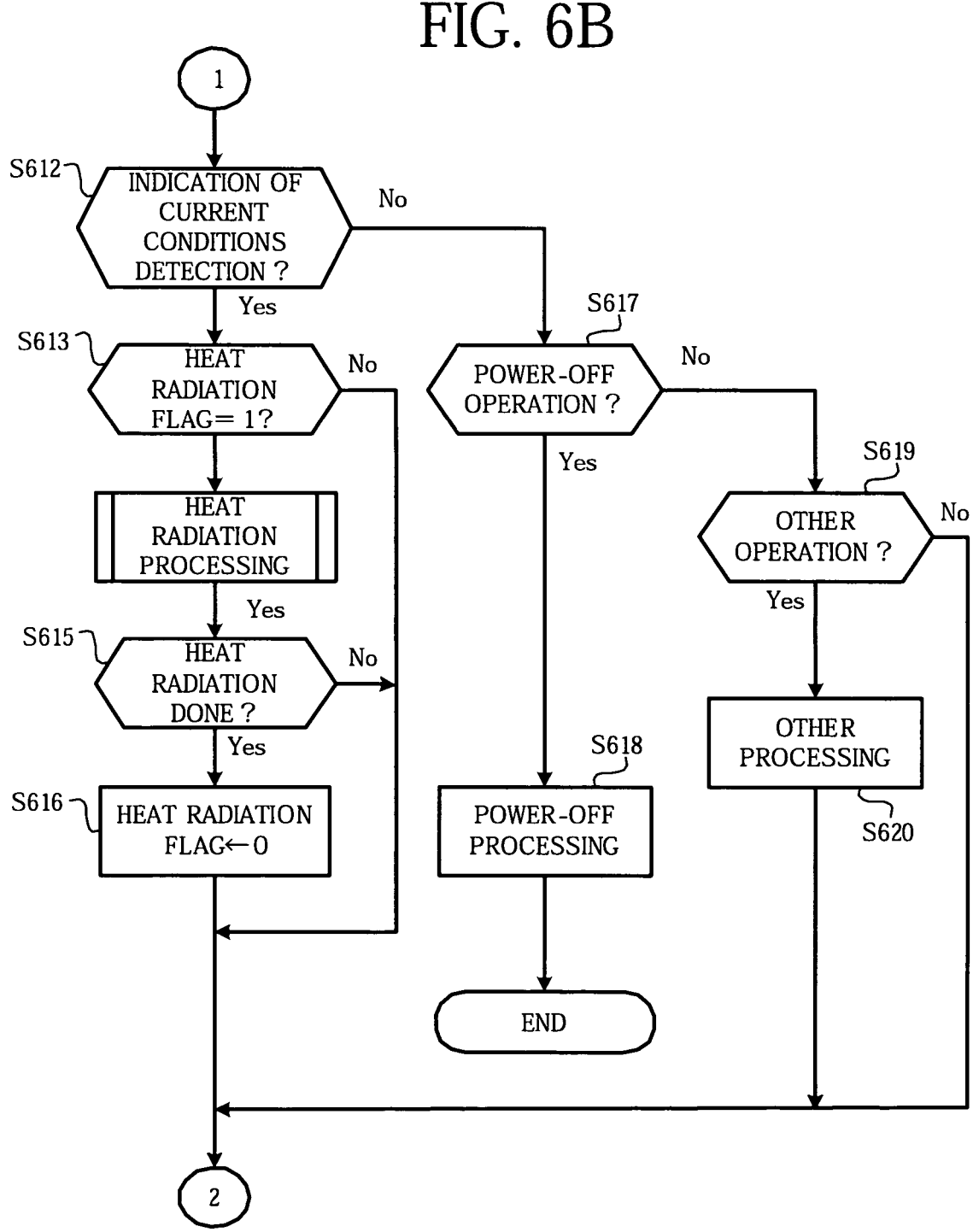

FIGS. 6A and 6B are flowcharts showing main operation of the cellular phone unit 100.

Firstly, after a power-on operation of the cellular phone unit 100 is performed by the user (S600: YES), the cellular phone unit 100 transits to a waiting processing state (S601).

Next, a heat radiation timer is started (S602) that detects whether "periodic condition" stored in the heat radiation condition storing part 401 is fulfilled or not (S603).

When predetermined setting operations are performed (S603: YES), the cellular phone unit 100 performs setting processing of contents of their settings of "heat radiation condition" stored in the heat radiation condition storing part 401, contents of their settings and setting flags of the "heat radiation suppression condition" stored in the heat radiation suppression condition storing part 402, and contents of their settings of the "heat radiation suppression release condition" stored in the heat radiation suppression release condition storing part 403, according to their operations (S604).

Figure 7B:
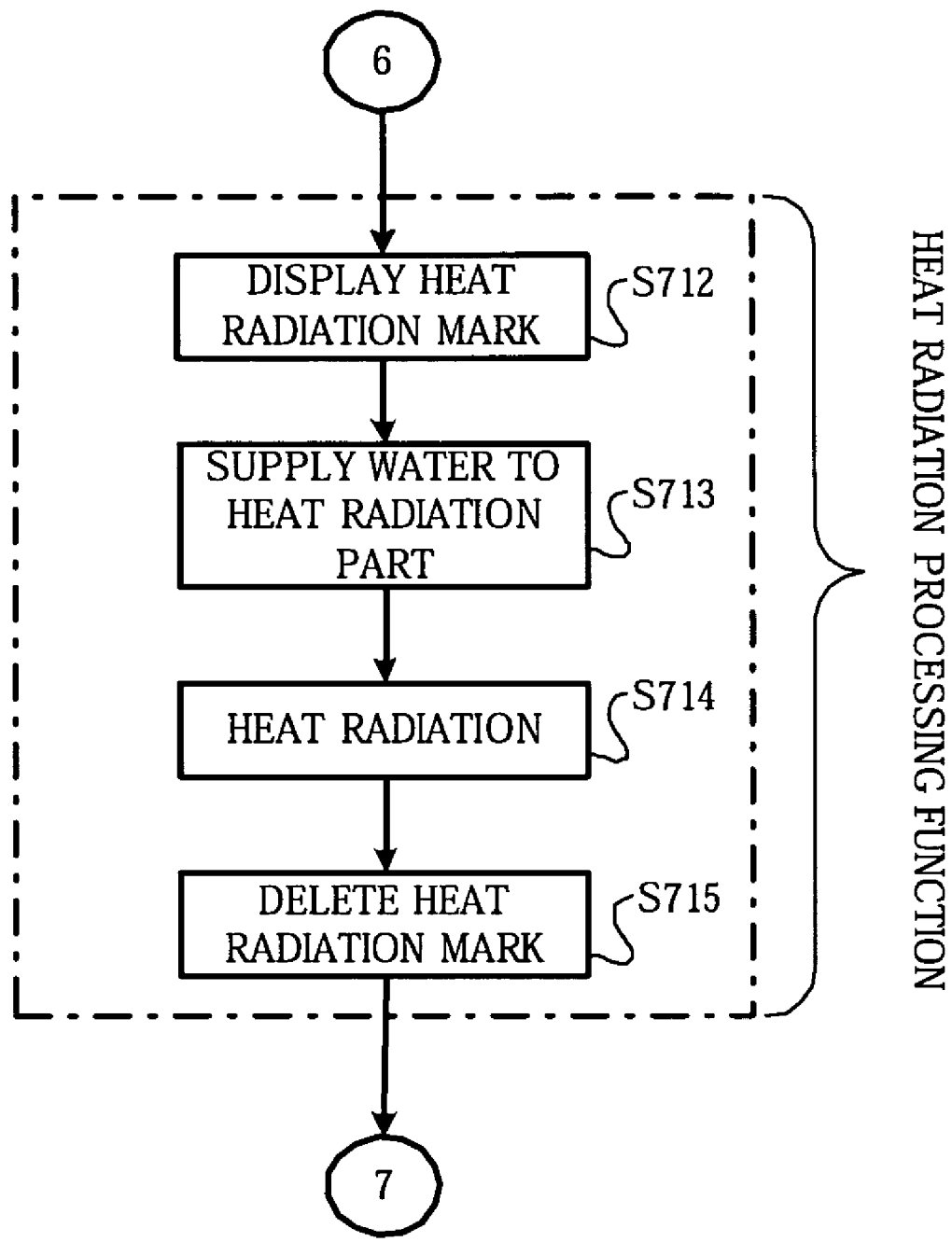

On the other hand, where the predetermined setting operations are not performed (S603: NO), upon a periodic instruction to detect the temperature, output from the central control unit 26 to the detection part 24 (S605: Yes), the temperature detection part 24 detects the temperature of the cellular phone unit 100 (S606). If the detected temperature fulfills the "temperature condition" in the heat radiation condition stored in the heat radiation condition storing part 401 (S607: YES), the central control unit 26 controls a heat radiation part 32 to radiate heat. Thereby, a series of heat radiation processing shown in FIGS. 7A to 7B are executed.

In the case that no indication for detecting temperature is output from the central control unit 26 to the temperature detection part 24 (S605: NO), when a heat radiation timer times out, that is, "periodic condition" stored in the heat radiation condition storing part 401 is fulfilled (S609: YES), the central control unit 26 controls the heat radiation part 32 to radiate heat. Thereby, a series of heat radiation processing shown in FIGS. 7A to 7B is started. After the heat radiation processing is started, the heat radiation timer restarts (S611). On the other hand, in the case that the heat radiation timer does not time out (S609: NO), when the central control unit 26 controls to periodically detect current conditions other than the "temperature condition" (S612: YES), the central control unit 26 discriminates whether the after-mentioned heat radiation flag is "1" or not (S613). When it is "1" (S613: YES), a series of heat radiation processing shown in FIGS. 7A to 7B is started. When the heat radiation processing is done (S615: YES), the after-mentioned heat radiation flag is set at "0" (S616). The heat radiation flag is set at "1", as shown in FIG. 7A, when none of "heat radiation suppression release conditions" is satisfied stored in the heat radiation suppression release condition storing part 403.

Thereafter, the user performs either power off operation (S617-S618) or other operations (S619-S620). When the poweroff operation and other operations are not performed (S619: NO), the operation returns to S603 again and operations after S603 are repeated. It is allowable that after the power source off processing (S618), the central control unit 26 detects various events such as output of temperature detection indication, time out of the heat radiation timer, indication that detects current condition to perform heat radiation or heat radiation suppression.

Heat radiation can be suppressed by providing a shutter (not shown) between the water supply part 30 and heat radiation part 32 and opening and closing the shutter. At this time, heat radiation can be prohibited by completely intercepting supply of water or suppressed according to a predetermined ratio by reducing the amount of supply of water. A mechanism to bring water from the water supply part 30 to the heat radiation part 32 is allowable along with the discharge of water vapor by opening and closing an outlet of the water vapor of the heat radiation part 32 with a shutter (not shown).

Figure 7C:
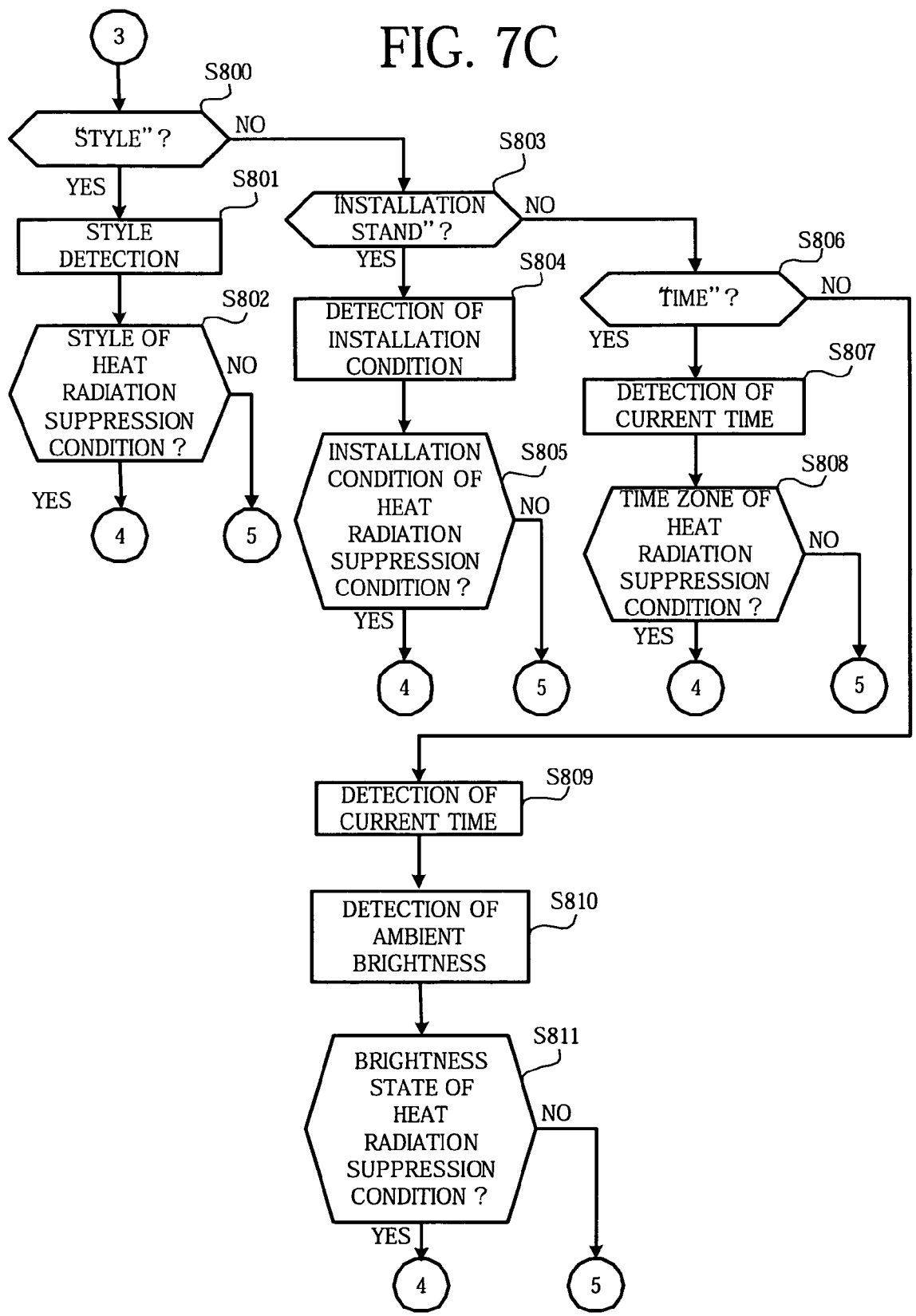

FIGS. 7A to 7C are flowcharts that illustrate operations of a series of heat radiation processing of the cellular phone unit 100.

The cellular phone unit 100 operates heat radiation suppression discrimination function (S700-S704). Specifically, the central control unit 26 reads out "heat radiation suppression condition", in which a setting flag is set at "1 (valid)" from the heat radiation suppression condition storing part 402

(S700). Then, if the read out heat radiation suppression condition is "function condition" (S701: YES), the central control unit 26 discriminates whether the function in operation is applicable to the content of the "function condition" (S702, S703). If it is applicable (S703: YES), the process shifts to the operation of the heat radiation suppression release discrimination function (S705-S707), and if not (S703: NO), it shifts to the operation of the heat radiation processing function (S712-S715).

When operating the heat radiation suppression release discrimination function (S705-S707), the central control unit 26 detects the temperature of the cellular phone unit 100 via the temperature detection part 24 (S705), and detects the quantity of water at the water supply part 30 (S706). Based on the detected temperature and quantity of water, the central control unit 26 discriminates whether "heat radiation suppression release condition" stored in the heat radiation suppression release condition storing part 403 (S707) is fulfilled. If none of the "heat radiation suppression release condition" is fulfilled (S707: YES), there is no need to release heat radiation suppression, so that the heat radiation flag is set at "1" (S708) and the heat radiation processing terminates.

On the other hand, when at least any one of the "heat radiation suppression release condition" is fulfilled (S707: NO), in order to promote heat radiation for the user, information display on the display part 12 and information sound output from the speaker 8 are conducted (S709, S710). Thereby, when a heat radiation indication operation (such as to press down a predetermined key) is conducted (S711: YES), the process shifts to the operation of the heat radiation processing function (S712-S715).

When operating the heat radiation processing function (S712-S715), a heat radiation mark showing that the heat radiation is in progress is displayed on the display part 12 (S712). Water is supplied from the water supply part 30 to the heat radiation part 32 for heat radiation (S713) and the heat radiation part 32 radiates heat by a vaporization heat generated by evaporating the supplied water (S714). When the heat radiation terminates, the heat radiation mark displayed on the display part 12 is deleted (S715) and the heat radiation processing terminates. When the heat radiation suppression condition read from the heat radiation suppression condition storing part 402 is not "function condition" (S701: NO), the process shifts to the operation of other functions (S800-S811) of heat radiation suppression discrimination shown in FIG. 7C.

When read heat radiation suppression condition is the "style condition" (S800: YES), the central control unit 26 discriminates whether the style detected by a style detection part 20 is applicable to the content of the "style condition" (open style or view style) shown in FIG. 4 (S801, S802). If it is applicable (S802: YES), the process shifts to the operation of the heat radiation suppression release discrimination function (S705-S707), and if not (S802: NO), it moves to the operation of the heat radiation processing function (S712-S715).

When read heat radiation suppression condition is "installation stand conditions" (S800: NO, S803: YES), the central control unit 26 discriminates whether installation condition of the installation stand 120, which is detected based on such as power source supply condition of the installation stand connection part 36, is applicable to the content (not installed) of installation stand condition shown in FIG. 4 (S804, S805). If it is applicable (S805: YES), the process shifts to the operation of the heat radiation suppression release discrimination function (S705-S707), and if not (S805: NO), it moves to the operation of the heat radiation processing function (S712-S715).

When read heat radiation suppression conditions is the "time condition" (S800, S803: NO, S806: YES), the central control unit 26 discriminates whether the current time information detected by the RTC 18 is applicable to the content (of time condition) (a time period for commutation from 7 a.m. to 8 p.m.) shown in FIG. 4 (S807, S808). If it is applicable (S808: YES), the process shifts to the operation of the heat radiation suppression release discrimination function (S705-S707), and if not (S808: NO), it moves to the operation of the heat radiation processing function (S712-S715).

When read heat radiation suppression condition is the "brightness condition" (S800, S803, S806: NO), the central control unit 26 discriminates whether the condition is applicable to the content (the surrounding area is dark in the daytime zone) of brightness condition shown in FIG. 4 based on the current time information detected by the RTC 18 and the surrounding brightness detected by a brightness detection part 22 (S809-S811). If it is applicable (S811: YES), the process shifts to the operation of the heat radiation suppression release discrimination functions (S705-S707), and if not (S811: NO), it moves to the operation of the heat radiation processing function (S712-S715).

In the operation of the heat radiation suppression discrimination function, it is discriminated in the order of function condition, style condition, installation stand condition, time condition, and brightness condition, however, the order is not limited thereto. In order to make the heat radiation suppression discrimination function executable effectively and in a shorter time, an order of discrimination in the heat radiation suppression discrimination function can be changed according to the user settings.

As mentioned above, in the first embodiment, when electronic devices are used in inappropriate conditions for heat radiation, heat radiation can be suppressed. Thereby, for example, it is possible to control heat radiation in line with how the cellular phone unit is used according to users' TPO (Time Place Opportunity).

With a simple configuration that water supply by the water supply part 30 is suppressed, it is possible to suppress heat radiation.

For example, like a camera function and image reproducing function, when the function in operation is not suitable for heat radiation, it is possible to suppress heat radiation.

For example, like the open style and view style, when condition of the casing is not suitable for heat radiation, it is possible to suppress heat radiation.

When electronic devices are not installed on the installation stand, that is, when it is considered that the user is using the electronic device, it is possible to suppress heat radiation.

When the time is not suitable for heat radiation, such as a time period for commutation in a crowded train, a time period when electronic devices are kept in the pocket of clothes or bags, a time period when the camera function or image reproducing function is used, it is possible to suppress heat radiation.

For example, in the case such as electronic devices are in the pocket of clothes or bags during a daytime when it is discriminated that conditions are not suitable for heat radiation due to the time and ambient brightness, it is possible to suppress heat radiation.

Even in an inappropriate condition for heat radiation, when heat radiation is needed, for example, under extremely high temperature, it is possible to prevent electronic devices from breaking down by releasing control to suppress heat radiation to radiate heat.

(A Second Embodiment of the Present Invention)

(1) Example of Device Configuration

Figure 8:
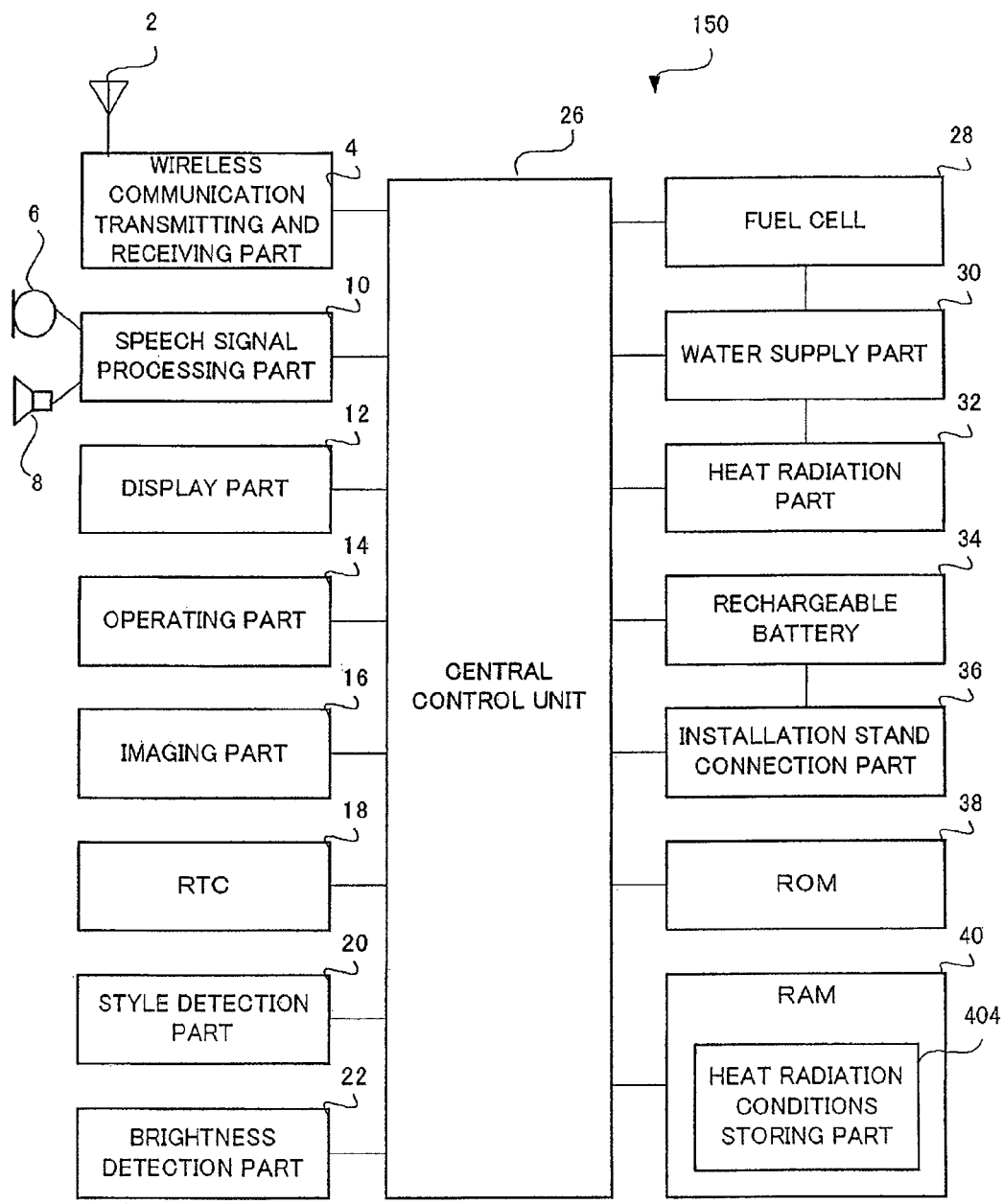
FIG. 8 is a block diagram showing the example of configuration of the cellular phone unit whose source of electric power is the fuel cell according to the second embodiment.

FIG. 8 is a block diagram showing an example of configuration of the cellular phone unit 150, whose source of electric power is the fuel cell 28 according to a second embodiment. In the second embodiment, a heat radiation condition storing part 404 is newly established when compared with the first embodiment.

The heat radiation condition storing part 404 stores "heat radiation condition" and their contents for the central control unit 26 to make the heat radiation part 32 to radiate heat. For example, as shown in FIG. 9, "function condition", "style condition", "installation stand condition", "time condition", "brightness condition", and "charging condition" are set as the "heat radiation suppression condition".

As for content of the "function condition", for example, it is set in such a way that "function possessed by the cellular phone unit 150 should operate for a predetermined time (for example, five minutes) or more". This is because when functions needing much power consumption such as data communications (streaming reproduction) and TV phone function operate for more than a predetermined time, the temperature of the cellular phone unit 150 rises and it is necessary to radiate heat. Accordingly, it is allowable to limit to designated functions needing much power consumption among functions installed on the cellular phone unit 150.

With regard to content of the "style condition", for example, "close style" is set. When the close style is set, there is a strong possibility that the cellular phone unit 150 is not in use, so that when heat radiates, it is not necessary to consider an adverse effect that the display part 12 mists up by water vapor accompanied by the heat radiation.

With regard to content of the "installation stand condition", for example, "installation" is set. This is because under the condition that the cellular phone unit 150 is installed on the installation stand 120, the user does not carry the cellular phone unit 150, therefore, even when heat is radiated, it is not necessary to consider an adverse effect by water vapor accompanied by the heat radiation.

With regard to content of the "time condition", for example, a "time zone from 18:00 to 20:00" is set. The setting is of a time zone (time zone except a time period for commutation or time zone after a regular hour in the office) having no inconvenience for the user to radiate heat.

With regard to content of the "brightness condition", for example, when "getting light" is set. If the surroundings of the cellular phone unit 150 are bright, it is not kept in the pockets and bags, so that heat can be radiated with no trouble.

With regard to content of the "charging condition", for example, "charging" is set. This is because while charging, the temperature of the cellular phone unit 150 rises and it is necessary to radiate heat. Further, while charging, there is a strong possibility that the cellular phone unit 150 is not in use, there is no adverse effect that the display part 12 mists up by water vapor accompanied by heat radiation. In the example shown in FIG. 9, "function condition" are set to be valid (setting flag=1) and other conditions being set to be invalid (setting flag=0). As for which condition is set to be valid, only one condition or multiple conditions can be set.

(2) Example of Device Operation

Figure 10A:
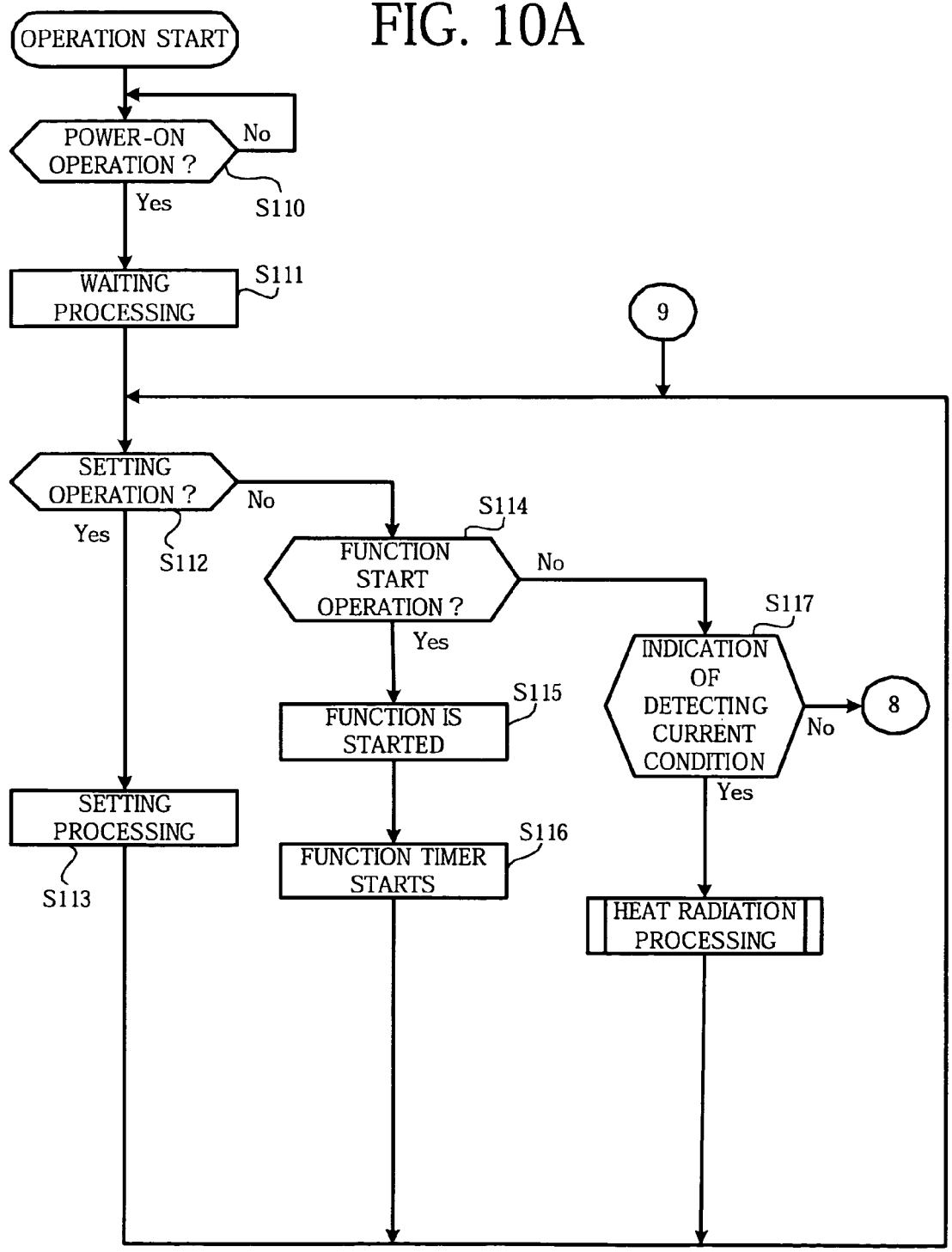
FIGS. 10A and 10B are flowcharts showing primary operations of the cellular phone unit according to the second embodiment.
Figure 10B:
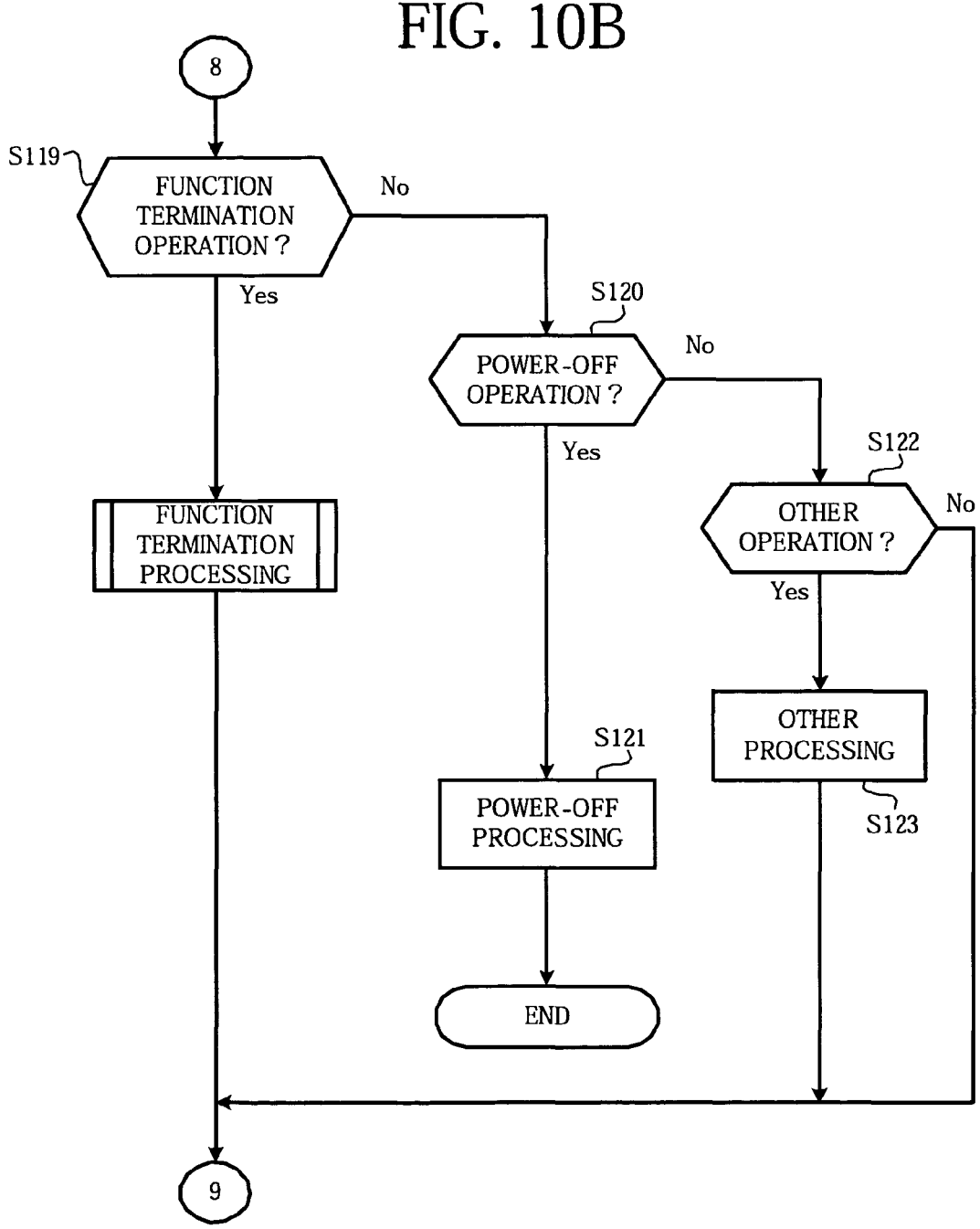

FIGS. 10A to 10B are flowcharts showing primary operations of the cellular phone unit 150.

Firstly, after operation of power-on of the cellular phone unit 150 by the user (S110: YES), the process transits to a waiting processing state (S111). When setting operation is performed by the user (S112: YES), according to the operation, the cellular phone unit 150 conducts setting processing of contents of their setting of heat radiation condition and setting flag to be stored in the heat radiation condition storing part 404 (S113). On the other hand, in the case that the user does not perform setting operation (S112: NO), when the user operates function of the cellular phone unit 150 (S114: YES), the function is started (S115) and a function timer starts (S116), which measures operation time of the function based on time information from the RTC 18.

Figure 11B:
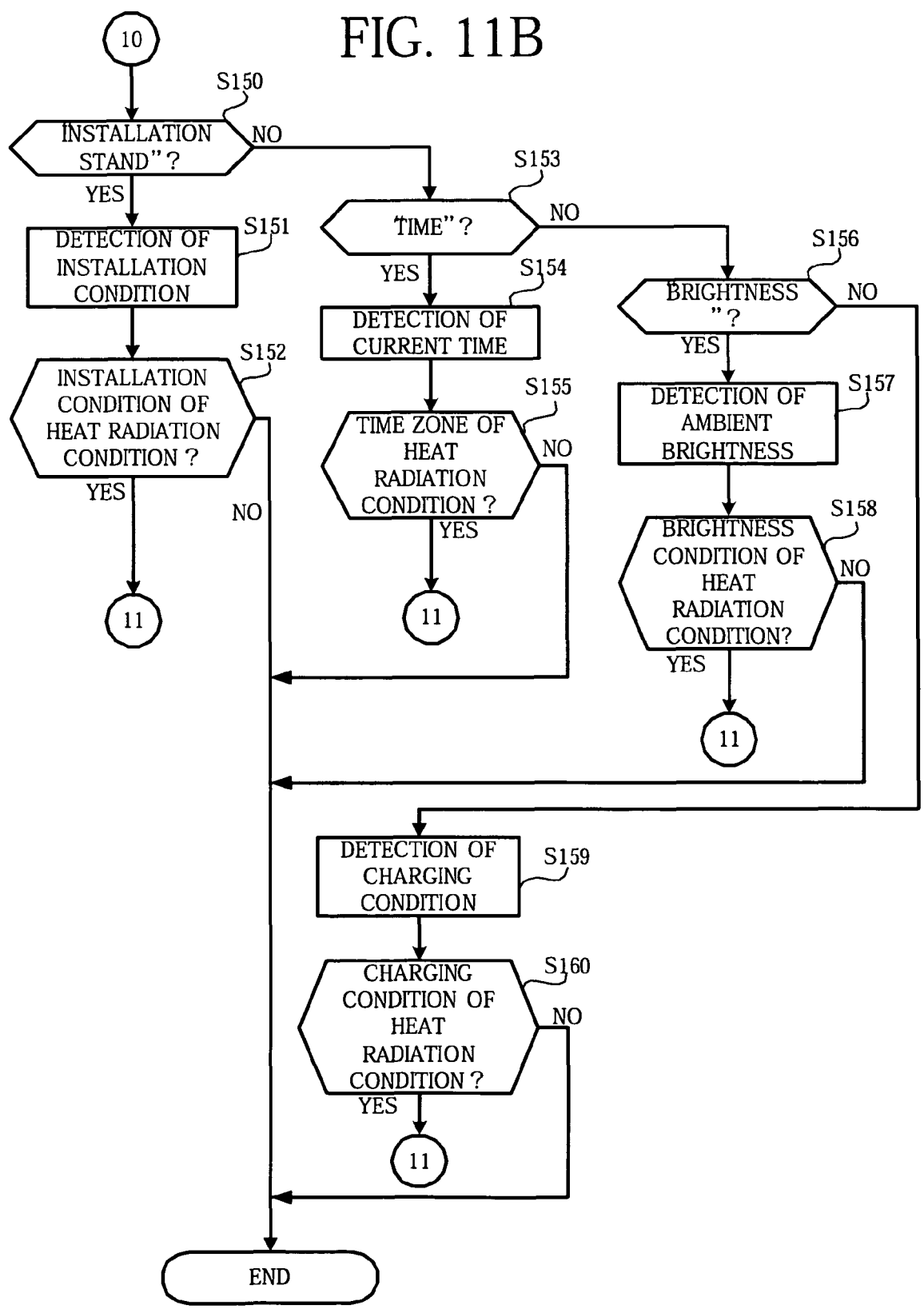
Figure 12:
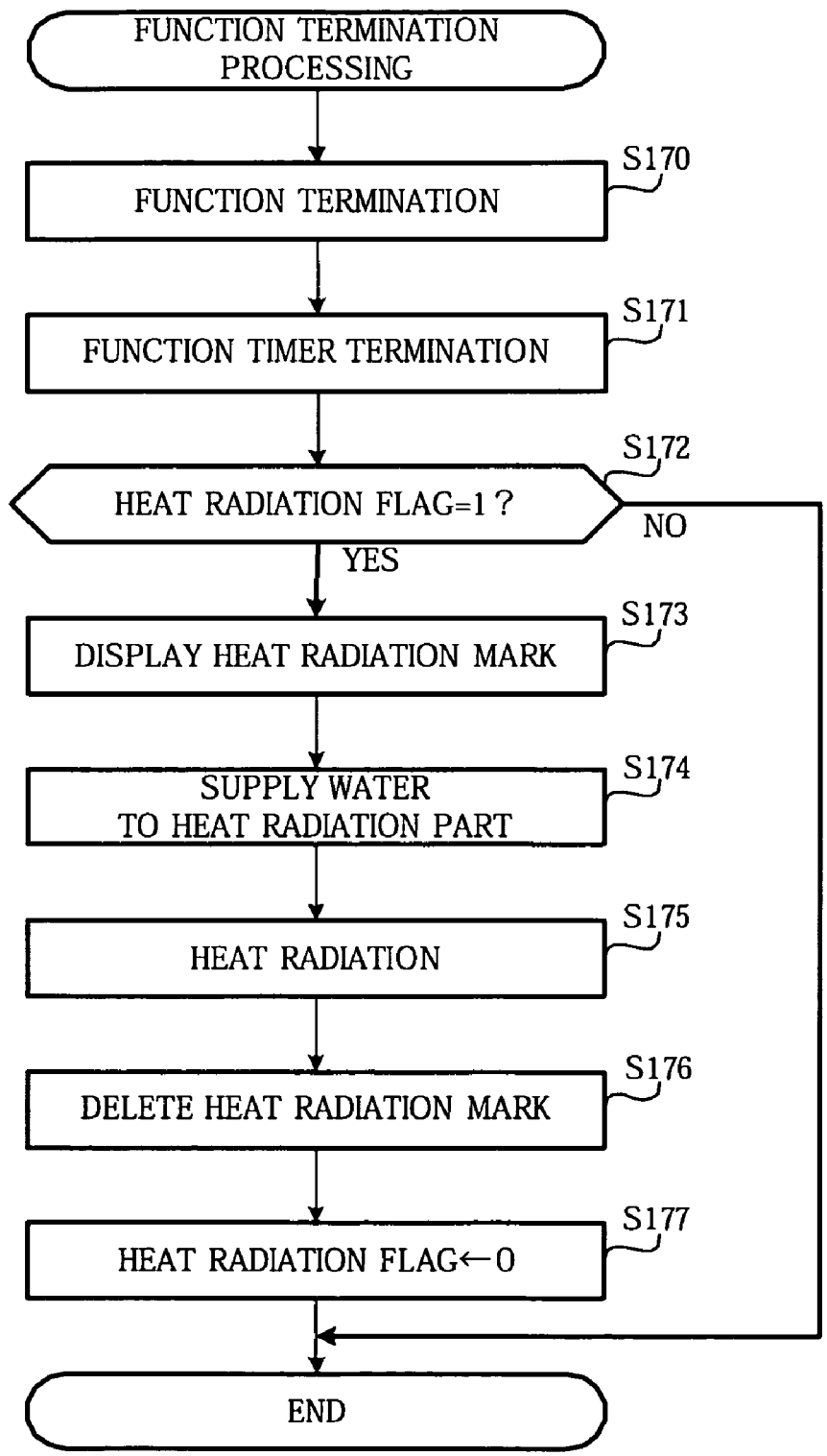
FIG. 12 is a flowchart illustrating the operation of function termination processing of the cellular phone unit according to the second embodiment.

When the user does not operate function of the cellular phone unit 150 (S114: NO), when the central control unit 26 indicates to periodically detect current condition (S117: YES), a series of heat radiation processing shown in FIGS. 11A to 11B is performed. On the other hand, when the central control unit 26 does not indicate to detect current condition (S117: NO) and the user performs termination operation of function of the cellular phone unit 150 (S119: YES), function termination processing shown in FIG. 12 is performed according to the operation time of the function.

When the user does not perform termination operation of functions of the cellular phone unit 150 (S119: NO), the user performs either power-off operation (S120-S121) or other operations (S122-S123). When power-off operation and other operations are not performed (S122: NO), the operation returns to S112 again and operations after S112 are repeated.

FIGS. 11A and 11B are flowcharts for illustrating operation of heat radiation processing of the cellular phone unit 150.

The cellular phone unit 150 firstly conducts a heat radiation discrimination function (S130-S137). Specifically, the central control unit 26 reads that heat radiation condition in which a setting flag is set at "1 (valid)", from the heat radiation condition storing part 404 (S130). When the read heat radiation condition is "function condition" (S131: YES), the central control unit 26 discriminates whether operation time of the currently operating function is applicable to content (to operate for five minutes or more) of the "function condition" (S132, S133). If it is applicable (S133: YES), after the heat radiation flag is set at "1" (S138), the heat radiation processing terminates. If not (S133: NO), the heat radiation processing terminates.

The heat radiation condition read from the heat radiation condition storing part 404 is not "function condition" (S131: NO), heat radiation discrimination is performed based on other heat radiation condition as follows.

If read heat radiation condition is the "style condition" (S134: YES), the central control unit 26 discriminates whether detected style by the style detection part 20 is applicable to content (close style) of the style conditions shown in FIG. 9 (S135, S136). If it is applicable (S136: YES), the process shifts to the operation of a heat radiation processing functions (S139-S142) which may be mentioned later. If not (S136: NO), heat does not radiate and the operation is terminated. If read heat radiation condition is not the "style condition" (S134: NO), other heat radiation discrimination shown in FIG. 11B is conducted.

In the heat radiation processing function as mentioned above, a heat radiation mark denoting that heat is being radiated is displayed on the display part 12 (S139). Water is supplied for heat radiation from the water supply part 30 to the heat radiation part 32 (S140) and the heat radiation part 32 radiate heat by the vaporization heat generated by evaporating the supplied water (S141). When heat radiation terminates, the heat radiation mark displayed on the display part 12 is deleted (S142) and the heat radiation processing terminates.

When read heat radiation condition is "installation stand condition" (S150: YES), the central control unit 26 discriminates whether an installation condition to the installation stand 120, which is detected based on the condition of the power supply of the installation stand connection part 36, is applicable to content (installation) of the "installation stand condition" shown by FIG. 9 (S151, S152). If it is applicable (S152: YES), the process shifts to the operation of the heat radiation processing function (S139-S142). If not (S152: NO), heat does not radiate and the operation is terminated.

When read heat radiation condition is "time condition" (S150: NO, S153: YES), the central control unit 26 discriminates whether current time information detected by the RTC 18 is applicable to the content (time zone of 18:00 to 20:00) of "time condition" shown in FIG. 11B (S154, S155). If it is applicable (S155: YES), the process shifts to the operation of the heat radiation processing function (S139-S142). If not (S155: NO), heat is not radiated and the operation is terminated.

When read heat radiation condition is "brightness condition" (S150, S153: NO, S156: YES), the central control unit 26 discriminates whether the condition of brightness of the cellular phone unit 150 detected by the brightness detection part 22 is applicable to content (getting light) of the "brightness condition" shown in FIG. 11B (S157, S158). If it is applicable (S158: YES), the process shifts to the operation of the heat radiation processing function (S139-S142). If not (S158: NO), heat is not radiated and the operation is terminated.

When read heat radiation condition is "charging condition" (S150, S153, S156: NO), the central control unit 26 discriminates whether the condition of charging of the cellular phone unit 150 detected based on the condition of power supply of the installation stand connection part 36 is applicable to content (charging) of the charging condition shown in FIG. 11B (S159, S160). If it is applicable (S160: YES), the process shifts to the operation of the heat radiation processing functions (S139-S142). If not (S160: NO), heat does not radiate and the operation is terminated.

In the above embodiment, the heat radiation discrimination function is determined in the order of function conditions, style condition, installation stand condition, time condition, brightness condition, and charging condition, however, the order is not limited thereto. When changing the determination order according to a priority specified by the user, it is possible to efficiently execute the heat radiation discrimination function in a shorter time.

FIG. 12 is a flowchart for illustrating the operation of the function termination processing of the cellular phone unit 150.

The central control unit 26 terminates functions in operation among functions of the cellular phone unit 150 (S170) and terminates the timing operation of the function timer as well (S171). Next, it discriminates whether the heat radiation flag is "1" or not (S172). If the heat radiation flag is not "1" (S172: NO), since operation time of the timed function by the function timer is not applicable to content (to operate for five minutes or more) of function conditions, heat is not radiated and the operation is terminated.

On the other hand, when the heat radiation flag is "1" (S172: YES), since operation time of the timed function by the function timer is applicable to contents of function condition, a heat radiation mark denoting that heat is being radiated is displayed on the display part 12 (S173). Water is supplied for heat radiation from the water supply part 30 to the heat radiation part 32 (S174) and the heat radiation part 32 radiates heat by the vaporization heat generated by evaporating the supplied water (S175). When heat radiation is completed, the heat radiation mark displayed on the display part 12 is deleted (S176), the heat radiation flag is set to "0", and the flowchart is terminated.

As mentioned above, in the second embodiment, it is possible to radiate heat according to the use condition of the electronic device. Since a temperature sensor is not necessary, the number of parts is reduced and it is possible to contribute to downsizing and cost reduction in production.

When heat radiation is needed, heat can be radiated as in the case where a function of large power consumption is made to operate for long hours.

Since heat is radiated after operation of the function is terminated, the user has no trouble even when the display part (screen) gets misted.

It is possible to radiate heat when condition of the casing is suitable for heat radiation like the close style.

It is possible to radiate heat when the electronic device is installed on an installation stand.

It is possible to radiate heat at the time when heat radiation is needed like a time zone when a function of large power consumption is made to operate for long hours. To the contrary, when the time is suitable for heat radiation, heat can be radiated like a time zone when the user does not use the electronic device.

When the user carries the electronic device outside the bags or pockets and it is judged from the ambient brightness that it is suitable for heat radiation, heat can be radiated.

When the user does not use the electronic device like during recharging and heat generation of the electronic device by recharging is considered to be large, heat can radiate.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2007-100844 filed on Apr. 6, 2007 and including specification, claims, drawings and summary. The disclosure of the above Japanese Patent Application is incorporated herein by reference in its entirety.

What is claimed is:

1. An electronic device having a fuel cell as a source of electric power and a heat radiator that radiates heat by evaporating water generated in accordance with electric power generation of the fuel cell, comprising:
    a water supplier that supplies the heat radiator with the water generated in accordance with the electric power generation of the fuel cell,
    a use condition detector that detects a use condition of the electronic device,
    a heat radiation discriminator that determines whether to radiate heat by the heat radiator based on the use condition detected by the use condition detector, and
    a heat radiation controller that controls the heat radiation by the heat radiator by controlling the water supply from the water supplier to the heat radiator in accordance with determined results of the heat radiation discriminator,
    wherein the use condition detector detects, as the use condition, whether a predetermined duration of time for operating a predetermined function needing much power consumption has elapsed, and the heat radiation discriminator discriminates the heat is to be radiated from the function needing much power consumption when the predetermined duration of time has elapsed; and wherein the function needing much power consumption is one of a streaming reproduction and a TV function.

2. The electronic device according to claim 1, wherein the function needing much power consumption comprises the streaming reproduction.

3. The electronic device according to claim 1, wherein the function needing much power comprises the TV function.

4. A non-transitory computer-readable recording medium encoded with a computer program executed by a computer that causes controlled heat radiation of an electronic device having a fuel cell as a source of electric power, a water supplier that supplies water generated in accordance with electric power generation of the fuel cell and a heat radiator radiating heat by evaporating the water supply by the water supplier, the computer program comprising:

program code executable by the computer for performing a use condition detector function that detects a use condition of the electronic device, program code executable by the computer for performing a heat radiation discriminating function that determines whether to radiate heat by the heat radiator based on the use condition detected by the use condition detection function, and program code executable by the computer for performing a heat radiation control function that controls the heat radiator by controlling the water supply from the water supplier to the heat radiator as a result of the determination by the heat radiation discrimination function;

wherein the use condition detecting function detects, as the use condition, whether a predetermined duration of time for operating a predetermined function needing much power consumption has elapsed, and the heat radiation discriminating function discriminates the heat is to be radiated from the function needing much power consumption when the predetermined duration of time has elapsed; and wherein the function needing much power consumption is one of a streaming reproduction and a TV function.

5. The non-transitory computer-readable medium according to claim 4, wherein the function needing much power consumption comprises the streaming reproduction.

6. The non-transitory computer-readable medium according to claim 4, wherein the function needing much power consumption comprises the TV function.

* * * * *